United States Patent
McClure

Patent Number: 5,386,377
Date of Patent: Jan. 31, 1995

[54] PARALLELIZED BORROW LOOK AHEAD SUBTRACTOR

[75] Inventor: David C. McClure, Carrollton, Tex.

[73] Assignee: SGS-Thomson Microelectronics, Inc., Carrollton, Tex.

[21] Appl. No.: 122,804

[22] Filed: Sep. 16, 1993

Related U.S. Application Data

[63] Continuation of Ser. No. 860,981, Mar. 31, 1992, abandoned.

[51] Int. Cl.$^6$ ................................................. G06F 7/50
[52] U.S. Cl. ................................................... 364/787
[58] Field of Search .......................................... 364/787

[56] References Cited

U.S. PATENT DOCUMENTS

| | | | |
|---|---|---|---|
| 2,879,001 | 3/1959 | Weinberger et al. | 364/787 |
| 3,202,806 | 8/1965 | Menne | 364/787 |
| 3,437,801 | 4/1969 | Wilhelm, Jr. | 364/787 |
| 3,697,735 | 10/1972 | Hanson | 364/787 |
| 4,504,924 | 3/1985 | Cook et al. | 364/787 |
| 4,592,005 | 5/1986 | Kregness | 364/736 |
| 4,660,165 | 4/1987 | Matsumoto | 364/787 |
| 4,888,739 | 12/1989 | Frederick et al. | 365/221 |
| 4,891,788 | 1/1990 | Kreifels | 365/189.01 |
| 4,935,719 | 6/1990 | McClure | 340/146.002 |
| 4,949,297 | 8/1990 | Matsuoka | 364/787 |
| 4,974,241 | 11/1990 | McClure et al. | 377/116 |
| 5,166,899 | 11/1992 | Lamb | 364/787 |

FOREIGN PATENT DOCUMENTS

0347029A2 12/1989 European Pat. Off.
0436905A2 7/1991 European Pat. Off.

*Primary Examiner*—David H. Malzahn
*Attorney, Agent, or Firm*—Renee M. Larson; Kenneth C. Hill; Lisa K. Jorgenson

[57] ABSTRACT

Therefore, according to the present invention, borrow look ahead circuitry suitable for use in a FIFO memory allows the difference between two values to be quickly generated and this difference compared to a third value. A borrow look ahead element generates a plurality of borrow signals which are supplied to CORRESPONDING full subtractors of a subtractor section in a parallel fashion. This parallel propagation reduces gates delays between the subtractors, resulting in faster operation. Thus, the time required to supply the difference to a comparator is minimized. Adding additional levels to the borrow look ahead element further increases the speed of the borrow look ahead circuitry.

11 Claims, 2 Drawing Sheets

PARALLELIZED BORROW LOOK AHEAD SUBTRACTOR

This is a continuation, of application Ser. No. 07/860,981, filed Mar. 31, 1992, now abandoned.

BACKGROUND OF THE INVENTION

1. Field of the Invention

The present invention relates generally to integrated circuits, and more specifically to a subtractor circuit.

2. Description of the Prior Art

Subtractor circuits find a wide variety of uses in the electronics industry, where the difference between two values is needed. For instance, subtractors are used in conjunction with high speed comparators in high speed flag logic for FIFO (First in First Out) memories. Subtractor circuits can also be used in arithmetic logic units (ALU's), found in PCs and other computers, to alert the system when the difference between two numbers exceeds a certain value.

Serial borrow propagation subtractors are a common form of subtractor circuits. They contain a number of full subtractors, each of which is capable of determining the difference between any two binary bits of data. With only a borrow input and two value inputs, a full subtractor can determine the difference between the two values. The full subtractor also produces a borrow output which is used as an input to the next full subtractor. Because of this propagation of the borrow signal from the output of one full subtractor to the input of the next full subtractor, the subtractors are said to be serially connected to one another.

The serial propagation of a borrow signal through many full subtractors can be very time consuming. Consider determining the difference between two sixteen bit numbers. The first subtractor determines the difference between the LSBs (Least Significant Bits) of the two numbers, generating a borrow output resulting from the subtraction operation. This borrow output value is used as the borrow input of the next full subtractor. The borrow input, along with the next two bits, LSB+1, are needed to perform the subtraction which generates the next borrow output value. This serial propagation process is continued until the difference between the last two bits, the MSBs (most significant bits), is determined. In each case, subtraction between two bits cannot occur until a borrow signal from the previous full subtractor is available. In addition to borrow propagation delays, there are gate delays between each successive full subtractor as well as required buffering circuitry. It is well known in the art that such a serial borrow propagation subtractor can be very slow.

The slow speed of serial borrow propagation subtractors can have an adverse effect on overall system performance. For instance, the speed of subtractors used in FIFO (First In First Out) memory applications is important. A FIFO flag tells the user how full the FIFO is. Flag logic, which is dependent on an internal subtractor, must be generated quickly. If the subtractor is slow, it will have an adverse affect on how quickly the flag logic can be generated.

Typically, the difference output of a serial borrow propagation subtractor is input to a comparator. The borrow propagates through the next full subtractor at the same time the comparator is performing its function. It is common for a comparator to complete its task much more quickly than can a serial borrow propagation subtractor; this necessitates the comparator spend idle time waiting for the subtractor to finish its task. In this instance, the serial borrow propagation subtractor delay becomes a bottle neck to the overall system performance. It therefore becomes desirable to speed up the borrow function so that an overall increase in system performance is realized.

A fundamental way to speed up the subtractor and therefore increase overall system performance is to minimize propagation delays caused by the purely serial borrow propagation from full subtractor to full subtractor. It would be desirable to accomplish this using current full subtractor design.

SUMMARY OF THE INVENTION

Therefore, according to the present invention, borrow look ahead circuitry suitable for use in a FIFO memory allows the difference between two values to be quickly generated and this difference compared to a third value. A borrow look ahead element generates a plurality of borrow signals which are supplied to corresponding full subtractors of a subtractor section in a parallel fashion. This parallel propagation reduces gates delays between the subtractors, resulting in faster operation. Thus, the time required to supply the difference to a comparator is minimized. Adding additional levels to the borrow look ahead element further increases the speed of the borrow look ahead circuitry.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

A FIFO is a First In First Out memory typically used in applications between machines that throughput data at different rates of speed: for instance, between a computer and a printer. The FIFO memory outputs its status through the use of a flag. Subtractors are frequently used in FIFO memory circuits to generate FIFO flags. The flag outputs may indicate that the FIFO is full, half full, half empty, and empty, for instance. In order to determine the status, it is necessary to keep track of how many bits have been written in and how many bits have been read out of the FIFO. Tracking the difference between these numbers is accomplished through the use of a subtractor circuit inside the FIFO.

Figure 1:
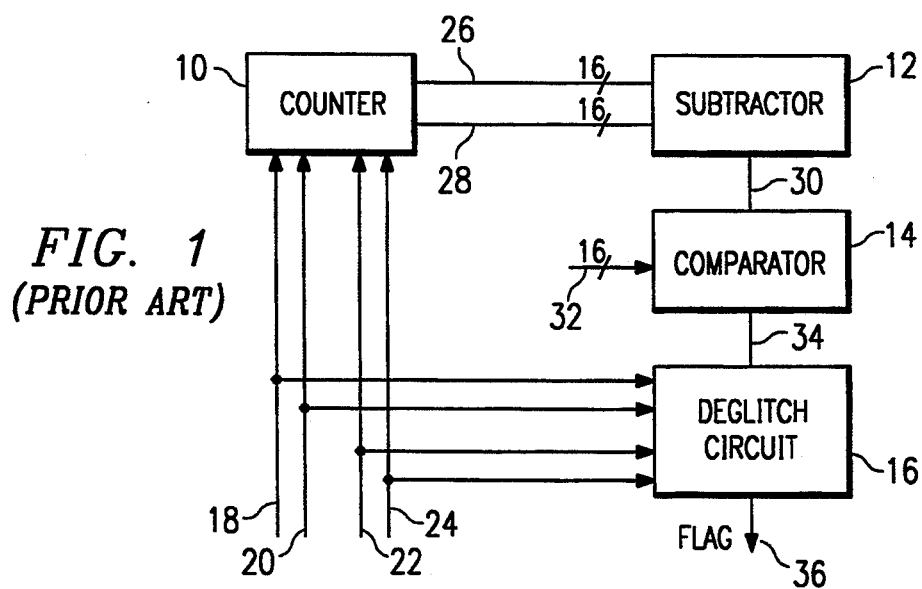
FIG. 1 is a block diagram of a FIFO flag generation circuit according to the prior art.

Referring to FIG. 1, a block diagram of a FIFO Flag generation circuit according to the prior art is shown. The FIFO Flag has a counter block 10, a subtractor block 12, a comparator block 14, and a deglitch block 16. The write clock 18, the read clock 20, the write reset clock 22, and the read reset clock 24 are input signals to both the counter block 10 and the deglitch block 16. The counter block 10 takes these input signals and generates a write count 26 and a read count 28 which are input to the subtractor block 12 which in turn outputs a difference signal 30. This difference signal 30 and a program value 32 are input to the comparator block 14 which compares them in order to generate an output compare signal 34. As is well known in the art, the program value 32 is set to different values depending on the type of flag signal 36, such as empty, half full, or full, to be generated. Finally, the compare signal 34 as well as the write clock 18, the read clock 20, the write reset clock 22, and the read reset clock 24 are input to the deglitch block 36 which generates a flag output signal 36.

Figure 2:
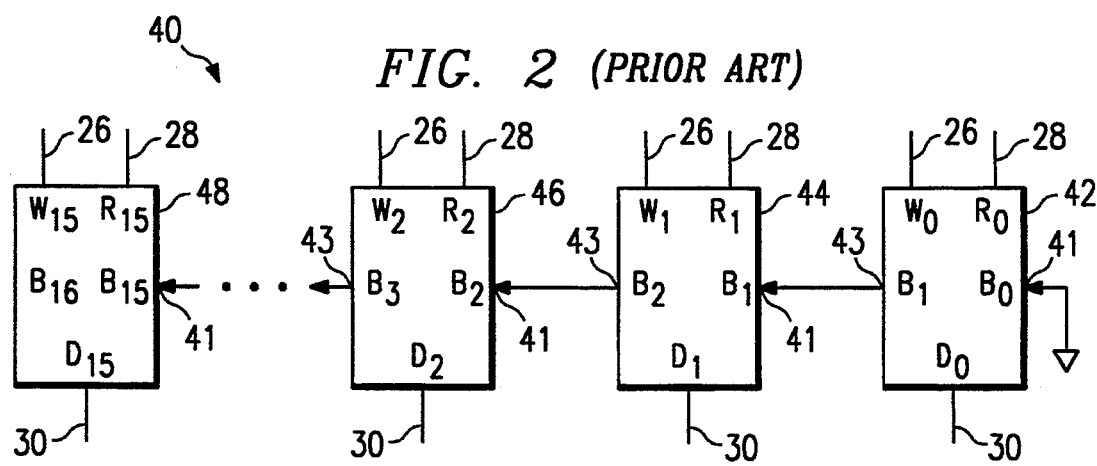
FIG. 2 is a schematic diagram of a serial borrow propagation subtractor utilized in the prior art.

Referring to FIG. 2, a schematic diagram of a serial borrow propagation subtractor 40 utilized in the prior art is shown. The subtractor 40 is responsible for calculating the difference between two binary numbers. The subtractor 40 has a plurality of full subtractors 42, 44, 46, and 48. Each full subtractor 42, 44, 46, and 48 has two data inputs. In the case of FIFO flag circuitry, the two data inputs are a write count input 26 and a read count input 28. An additional input to the full subtractor 42, 44, 46, and 48 is a borrow input 41 which is generated from the previous subtractor. The read count input 28 is subtracted from the write count input 26, and the difference, taking into account the previous subtractor borrow 41, is a difference output 30. Also output as a result of the subtraction operation is a borrow output 43. The borrow output 43 of the full subtractor 42 is connected to the borrow input 41 for the next subsequent full subtractor 44. It should be noted that the borrow input 41 to the initial full subtractor 42 is a predetermined value. As shown in FIG. 2, the borrow input 41 of full subtractor 42 is tied to ground at a logic low level.

The full subtractors 42, 44, 46, and 48 of the subtractor 40 are serially connected to one another by the borrow signals 41 and 43. The borrow output 43 of full subtractor 42 drives the subsequent full subtractor 44 through its borrow input 41. The initial full subtractor 42 is responsible for computing the difference between the least significant bits (LSBs) of two binary numbers. Before the difference of the next bits, the LSB+1, can be computed by the subsequent full subtractor 44, its borrow input 41 must first be generated by the previous full subtractor 42. In the case where the difference between two sixteen bit numbers is generated, a borrow input will need to be generated for each of sixteen full subtractors with their attendant propagation delays. As is well known in the art, this can be quite time consuming. This sixteen bit example is only one of many possible ways to implement a serial borrow propagation subtractor.

Figure 3:
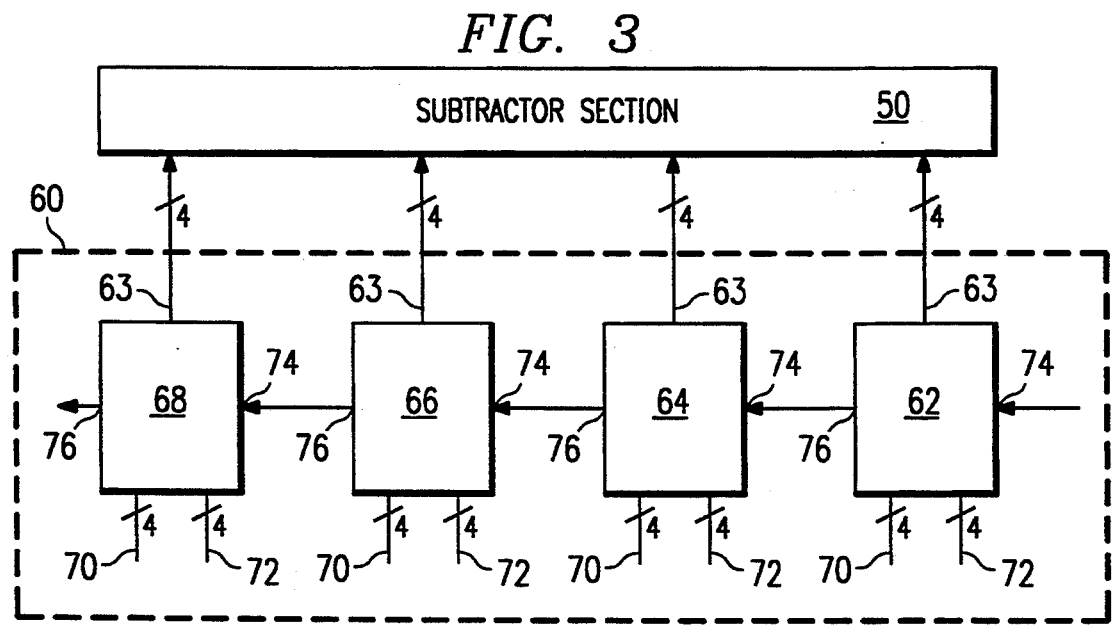
FIG. 3 is a block diagram of a borrow look ahead subtractor according to present invention.

Referring to FIG. 3, a block diagram of a borrow look ahead subtractor according to the present invention is shown. A borrow look ahead subtractor has a subtractor section 50 and a look ahead logic section 60. As shown, the subtractor section 50 is composed of a plurality of full subtractors similar to the full subtractors 42, 44, 46, and 48 shown in FIG. 2. The look ahead logic section 60 has a plurality of look ahead blocks 62, 64, 66, and 68. Each look ahead block 62, 64, 66, and 68 generates the borrow inputs needed by the corresponding full subtractors so that subtraction may be performed. In a 16 bit example, the subtractor section 50 has 16 full subtractors and the logic section has 4 look ahead blocks 62, 64, 66, and 68. Each look ahead block 62, 64, 66, and 68 has a write count 70 input, a read count 72 input, and a borrow 74 input. These signals are input to logic, defined by boolean algebra equations, which generates the four borrow output signals 63, which feed into 4 corresponding full subtractors, and the last borrow output 76, which drives the subsequent borrow logic section. Since the four borrow output signals 63 are derived and generated inside the look ahead blocks 62, 64, 66, and 68, it is no longer necessary for each full subtractor to individually generate each borrow output signal 63 which is analogous to the borrow output 43 shown in FIG. 2. Such parallel propagation of the borrow signal is more efficient and faster than serial propagation.

Figure 4:
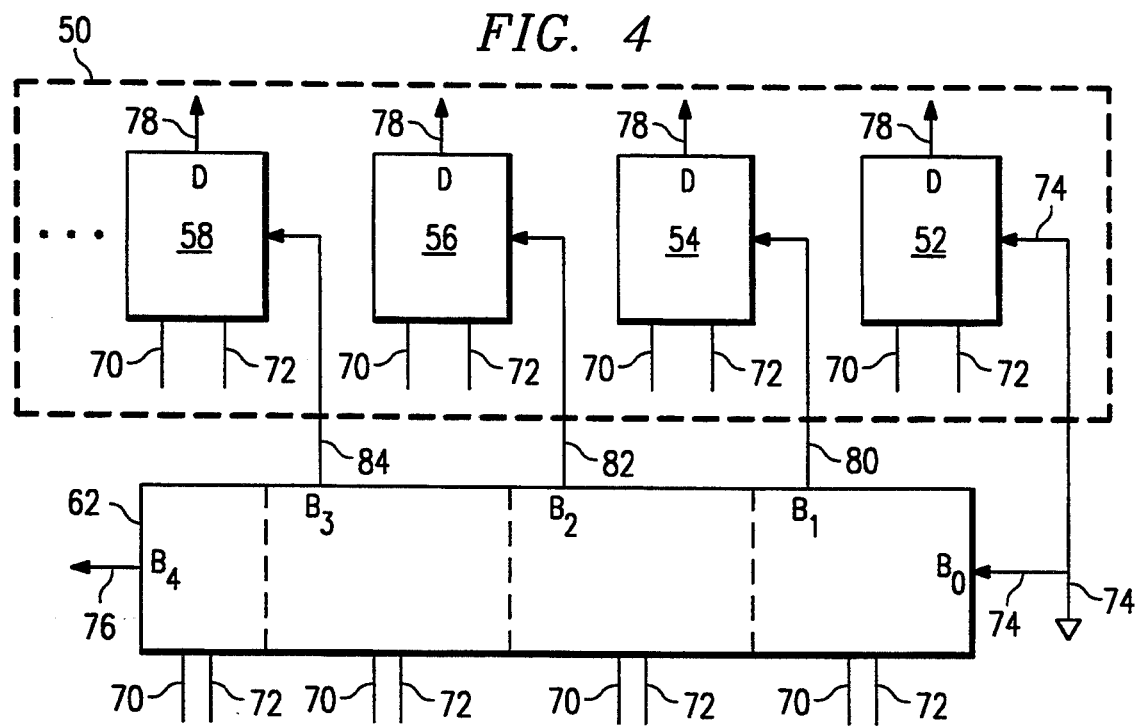
FIG. 4 is a schematic diagram of a portion of a borrow look ahead subtractor according to the present invention.

Referring to FIG. 4, a schematic diagram of a portion of a borrow look ahead subtractor according to the present invention is shown. The portion shown is the first look ahead block 62 and the corresponding first four full subtractors 52, 54, 56, and 58 of the subtractor section 50. Subtractor section 50 has four full subtractors 52, 54, 56, and 58. Each full subtractor 52, 54, 56, and 58 has as its inputs a write count input 70, a read count input 72, and a borrow input 74. These three input signals are used by the full subtractors 52, 54, 56, and 58 to generate the difference output 78.

In FIG. 4, the look ahead block 62 has as its inputs the borrow input 74, 4 consecutive bits of the write count 70, and 4 consecutive bits of the read count 72. From these inputs, look ahead block 62 generates the borrow outputs 80, 82, and 84 which are input to the full subtractors 54, 56, and 58, respectively. Borrow output 76 is generated for the next logic section 64. The initial full subtractor 52 is driven by a write count 70, a read count 72, and the initial borrow input 74. The circuitry inside the look ahead block 62 is determined by boolean algebra equations in the general form as follows:

$$B_{i+1} = G_i + P_i * B_i$$

where $B_0$ = the initial borrow input
$B_i$ = the borrow input
$B_{i+1}$ = the borrow output
$G_i = R_i * W_i$ stands for generate
$P_i = R_i * W_i$ stands for propagate Per this basic equation, the four borrow outputs 80, 82, 84, and 76, respectively, have the following form:

$$B_1 = G_0 + P_0 * B_0$$

$$B_2 = G_1 + P_1 * B_1$$

$$B_3 = G_2 + P_2 * B_2$$

$$B_4 = G_3 + P_3 * B_3$$

In FIG. 4, the initial borrow input 74 is an input to both the initial full subtractor 52 and the initial look ahead block 62 and is set to a predetermined level, tied low to ground. Another important feature is that the final borrow 76 is derived and generated in look ahead block 62 and serves as the borrow input to the subsequent look ahead block. These equations are analogous to equations for a carry look ahead adder which is well known in the art. However, propagate P and generate G are defined differently as shown above.

Figure 5:
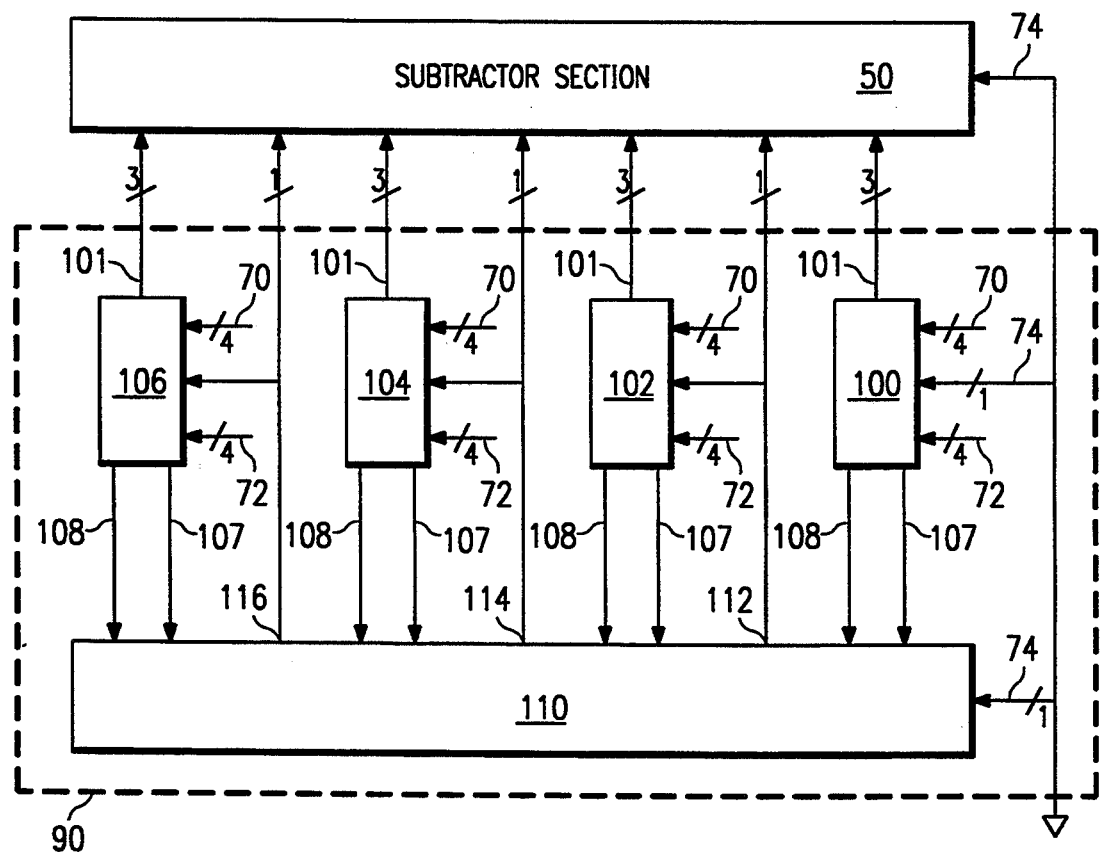
FIG. 5 is a block diagram of a two level borrow look ahead subtractor according to the present invention.

It is appreciated by those skilled in the art that numerous variations of the circuitry described above may be implemented. For example, FIG. 5 shows a block diagram of a two level borrow look ahead subtractor according to the present invention. The two level borrow look ahead subtractor has two sections analogous to the borrow look ahead subtractor of FIG. 4—namely, a subtractor section 50 and a logic section 90. However, a difference between the borrow look ahead subtractor and the two level borrow look ahead subtractor is that the logic section 90 of FIG. 5 is configured differently than the logic section 60 of FIG. 4.

In FIG. 5, the two level logic section 90 contains a plurality of look ahead blocks 100, 102, 104, and 106 and a 2nd level borrow logic section 110. The look ahead blocks 100, 102, 104, and 106 are analogous to the look ahead blocks 62, 64, 66, and 68 of FIG. 3 in that they provide three borrow output signals 101 to the full subtractors. As in FIG. 4, these three borrow output signals 101 are generated by logic gates analogous to those discussed above.

The first level look ahead blocks 100, 102, 104, and 106 are each given four consecutive write count 70 inputs and four consecutive read count 72 inputs which are used to generate one group generate 107 output and one group propagate 108 output. In turn, the two level borrow logic section 110 generates borrow output signals 112, 114, and 116 when given a total of four group generate 107 outputs and four group propagate 108 outputs, These borrow output signals 112, 114, and 116 are in turn used by the subtractor section 50 and the look ahead blocks 102, 104, and 106 to generate the three borrow outputs 101 used by the full subtractors of the subtractor section. Note that, as in FIG. 3, the initial borrow input 74 drives both the first full subtractor 52 as well as the initial look ahead block 100. The advantage of the two level borrow look ahead subtractor of FIG. 5 is that the process of generating and then propagating borrow signals is more parallel and less serial than the process described in FIG. 4 for the borrow look ahead subtractor. As a result, gate delays are minimized and speed of the overall process increases.

The boolean algebra equations which define the logic circuitry for the two level borrow look ahead subtractor are analogous to those for the borrow look ahead subtractor of FIG. 4 and are given below. The second level is constructed based on a group propagate and a group generate:

$$B_4 = G_3 + P_3{}^*G_2 + P_3{}^*P_2{}^*G_1 + P_3{}^*P_2{}^*P_1{}^*G_0 + P_3{}^*P_2{}^*P_1{}^*P_0{}^*B_0$$

where the first 4 terms are the group generate
where the last term is the group propagate, excluding $B_0$
Using the same general form of $B_{i+1} = G_i + P_i{}^*B_i$.

$$B_4 = B_{1G} = G_{0G} + P_{0G}{}^*B_{0G} = G_{0G} + P_{0G}{}^*B_0$$

$$B_8 = B_{2G} = G_{1G} + P_{1G}{}^*B_{1G} = G_{1G} + P_{1G}{}^*G_{0G} + P_{1G}{}^*P_{0G}{}^*B_0$$

$$B_{12} = B_{3G} = G_{2G} + P_{2G}{}^*B_{2G} = G_{2G} + P_{2G}{}^*G_{1G} + P_{2G}{}^*P_{1G}{}^*G_{0G} + P_{2G}{}^*P_{1G}{}^*P_{0G}{}^*B_0$$

The borrow look ahead subtractor described above offers faster speed than the prior art serial borrow propagation subtractor. The device speed is accomplished by minimizing the propagation delays associated with serial propagation of a borrow signal through each full subtractor. The two level borrow look ahead subtractor provides even faster performance than the borrow look ahead subtractor because its propagation delays are even smaller. Also, in the two level borrow look ahead subtractor of FIG. 5, the borrow signal does not propagate serially through the first level logic section, but is generated at the second level logic section to improve speed. More logic levels can be added to further reduce the propagation delays of the subtractor and therefore faster for applications with more than sixteen bits. This increased speed is at the expense of increased circuit complexity, but speed is worth this tradeoff in many high performance applications.

The parallelized borrow look ahead subtractor is faster in operation than the prior art serial borrow propagation subtractor because propagation delays associated with generating borrow signals in a parallel fashion are smaller. Thus, the prior art problem of comparators waiting for a serial borrow propagation subtractor to complete the subtraction function is minimized.

The parallelized borrow look ahead subtractor has been described in relation to a FIFO flag generation circuit. The subtractor can also be used in a multitude of other applications such as in arithmetic logic units (ALUs) of computers where it is necessary to generate and use the difference between two numbers.

While the invention has been particularly shown and described with reference to two preferred embodiments, it will be understood by those skilled in the art that various changes in form and detail may be made therein without departing from the spirit and scope of the invention.

What is claimed is:

1. Borrow look ahead circuitry for use with circuitry which determines the relative difference between a first value and a second value and compares that difference to a third value, comprising:

a subtractor section of the borrow look ahead circuitry, having a plurality of full subtractors arranged in subtractor groups, wherein each full subtractor computes a difference between one bit of a first value input and a corresponding one bit of a second value input when given a one bit borrow signal and wherein each subtractor group has an initial full subtractor and the subtractor second has an initial subtractor group, wherein a difference is computed between the first value and the second value;

a borrow look ahead logic section of the borrow look ahead circuitry having a plurality of borrow look ahead blocks wherein the borrow look ahead blocks include a plurality of first level blocks, having an initial first level block, and a second level block, wherein the first level blocks generate borrow signals which are input signals to the full subtractors of a corresponding subtractor group, and wherein the second level block generates borrow signals which are input signals to the first level blocks and the full subtractors of the corresponding subtractor group; and a comparator which compares the difference between the first value and the second value to a third value.

2. The circuitry of claim 1, wherein each borrow look ahead block generates a borrow output signal which is an input borrow signal to a subsequent borrow look ahead block.

3. The circuitry of claim 2, further comprising an initial borrow signal which is an input signal to the initial full subtractor of the initial subtractor group and the initial borrow look ahead block, wherein the initial borrow signal is set to a predetermined level.

4. The circuitry of claim 1, further comprising an initial borrow signal which is an input signal to the initial full subtractor of the initial subtractor group, the initial first level block, and the second level block, wherein the initial borrow signal is set to a predetermined level.

5. The circuitry of claim 1, wherein the first value input and the second value input are a FIFO read count and a FIFO write count, respectively.

6. The circuitry of claim 1, wherein each borrow look ahead block corresponds to a corresponding subtractor group, and wherein each borrow look ahead block, utilizing the first value input and the second value input, generates the borrow signals needed by a subsequent borrow look ahead block and the corresponding subtractor group.

7. The circuitry of claim 6, further comprising an initial borrow signal to be input to the initial borrow look ahead block and the initial full subtractor of the initial subtractor group, wherein said initial borrow signal is set to a predetermined level.

8. The circuitry of claim 6, wherein each borrow look ahead block corresponds to a corresponding subtractor group having four full subtractors.

9. The circuitry of claim 8, wherein there are four borrow look ahead blocks each of which corresponds, to a corresponding subtractor group having four full subtractors to define a sixteen bit FIFO flag generation circuit.

10. The circuitry of claim 9, wherein each borrow took ahead block generates four borrow signals for the corresponding subtractor group.

11. The circuitry of claim 6, wherein the first value input and the second value input are read and write signals.

* * * * *

UNITED STATES PATENT AND TRADEMARK OFFICE
CERTIFICATE OF CORRECTION

PATENT NO. : 5,386,377

DATED : January 31, 1995

INVENTOR(S) : David C. McClure

It is certified that error appears in the above-identified patent and that said Letters Patent is hereby corrected as shown below:

Claim 1, column 6, line 46, change

"second" to --section--.

Signed and Sealed this

Second Day of May, 1995

Attest:

BRUCE LEHMAN

*Attesting Officer*      *Commissioner of Patents and Trademarks*